US010271601B2

(12) United States Patent
Chang

(10) Patent No.: US 10,271,601 B2
(45) Date of Patent: Apr. 30, 2019

(54) HELMET

(71) Applicant: Tzu-Chiang Chen, Taoyuan (TW)

(72) Inventor: Le-Yen Chang, Taoyuan (TW)

(73) Assignee: Tzu-Chiang Chen, Taoyuan (TW)

( * ) Notice: Subject to any disclaimer, the term of this patent is extended or adjusted under 35 U.S.C. 154(b) by 0 days.

(21) Appl. No.: 16/002,090

(22) Filed: Jun. 7, 2018

(65) Prior Publication Data

US 2018/0360152 A1 Dec. 20, 2018

(30) Foreign Application Priority Data

Jun. 14, 2017 (TW) .............................. 106119887 A

(51) Int. Cl.
F16M 13/00 (2006.01)
A42B 3/04 (2006.01)
A45F 5/02 (2006.01)
G03B 17/56 (2006.01)

(52) U.S. Cl.
CPC ................ *A42B 3/042* (2013.01); *A45F 5/02* (2013.01); *F16M 13/00* (2013.01); *G03B 17/561* (2013.01); *A45F 2005/025* (2013.01); *A45F 2200/0533* (2013.01)

(58) Field of Classification Search
CPC ......... A42B 1/272; A42B 1/244; A42B 1/245; A42B 1/247; A42B 3/042; A42B 3/0426; A42B 3/0433; A42B 3/044; A42B 3/046; A42B 3/0446; A42B 3/30; A42B 3/306; A45F 5/02; A45F 2005/025; A45F 2005/026; A45F 2005/028; A45F 2200/0533; G03B 17/561; G02B 23/125; F16M 11/041; F16M 13/00; F16M 13/04; F16M 13/022

USPC ............. 2/422, 6.2; 224/181, 182, 270, 271; 396/419, 428; 569/409
See application file for complete search history.

(56) References Cited

U.S. PATENT DOCUMENTS

| 4,090,232 A | * | 5/1978 | Golden | F21L 14/00 362/105 |
| 4,298,913 A | * | 11/1981 | Lozar | A42B 3/044 362/103 |
| 4,592,096 A | * | 6/1986 | Glasheen | A42B 3/042 2/427 |
| 4,809,942 A | * | 3/1989 | Kastendieck | A42B 3/042 248/222.13 |

(Continued)

FOREIGN PATENT DOCUMENTS

TW I249994 B 3/2006

*Primary Examiner* — Jameson D Collier
*Assistant Examiner* — Heather N Mangine
(74) *Attorney, Agent, or Firm* — Alan D. Kamrath; Kamrath IP Lawfirm, P.A.

(57) ABSTRACT

The helmet has a cap, and a turning assembly and a fastening device assembled on the cap. The helmet is formed as an integral whole and has a simplified and compact structure. A camera is mounted to the fastening device and is held by a lower holder and an upper holder of the turning assembly. A locking panel of the fastening device allows the camera to be easily and quickly mounted onto the cap via the fastening device or removed from the fastening device. With a locking member engaging in or disengaging from one of multiple engaging recesses of a corresponding guiding rod of the turning assembly, a position of the camera relative to the cap can be also easily and quickly adjusted.

18 Claims, 14 Drawing Sheets

(56) References Cited

U.S. PATENT DOCUMENTS

| | | | | |
|---|---|---|---|---|
| 4,987,608 A * | 1/1991 | Cobb | A42B 3/04 | 2/422 |
| 5,331,684 A * | 7/1994 | Baril | G02B 23/125 | 2/422 |
| 5,416,922 A * | 5/1995 | Horvat | A42B 3/042 | 2/422 |
| 5,467,479 A * | 11/1995 | Mattes | A42B 3/04 | 2/422 |
| 5,471,678 A * | 12/1995 | Dor | A42B 3/042 | 2/422 |
| 5,506,730 A * | 4/1996 | Morley | A42B 3/04 | 2/422 |
| 5,535,053 A * | 7/1996 | Baril | G02B 23/125 | 250/214 VT |
| 5,542,627 A * | 8/1996 | Crenshaw | A42B 3/04 | 2/6.3 |
| 5,564,128 A * | 10/1996 | Richardson | A42B 3/044 | 2/422 |
| 5,581,806 A * | 12/1996 | Capdepuy | A42B 3/04 | 2/422 |
| 5,678,205 A * | 10/1997 | Gray | A42B 3/10 | 455/348 |
| 5,914,816 A * | 6/1999 | Soto | A42B 3/04 | 2/6.5 |
| 5,988,577 A * | 11/1999 | Phillips | A45F 5/02 | 224/197 |
| 6,115,846 A * | 9/2000 | Truesdale | A42B 3/042 | 2/171.3 |
| 6,302,558 B1 * | 10/2001 | Parks | A42B 3/044 | 362/155 |
| 6,472,776 B1 * | 10/2002 | Soto | A42B 3/04 | 307/400 |
| 6,484,918 B1 * | 11/2002 | Lefebvre | A45F 5/02 | 181/131 |
| 6,560,029 B1 * | 5/2003 | Dobbie | G02B 23/125 | 2/6.1 |
| 6,662,370 B1 * | 12/2003 | Buchanan, Jr. | A42B 3/04 | 2/422 |
| 6,957,449 B2 * | 10/2005 | Prendergast | A42B 3/04 | 2/422 |
| 7,156,536 B1 * | 1/2007 | McCorkle | A42B 3/04 | 224/181 |
| 7,219,370 B1 * | 5/2007 | Teetzel | A42B 3/04 | 2/422 |
| 7,418,738 B2 * | 9/2008 | Prendergast | A42B 3/04 | 2/22 |
| 7,621,000 B1 * | 11/2009 | Fulton | A42B 1/24 | 2/195.1 |
| 7,665,698 B2 * | 2/2010 | Desorbo | F16M 11/14 | 248/187.1 |
| 7,703,731 B1 * | 4/2010 | Kuo | G03B 17/56 | 248/126 |
| 7,963,426 B2 * | 6/2011 | Gruebel | H01R 13/73 | 2/422 |
| 8,009,229 B1 * | 8/2011 | Peterson | A42B 3/042 | 345/8 |
| 8,120,857 B2 * | 2/2012 | Hedges | A42B 3/04 | 345/7 |
| 8,209,780 B1 * | 7/2012 | Lemire | A42B 3/04 | 2/422 |
| 8,239,971 B2 * | 8/2012 | Prendergast | G02B 23/125 | 2/422 |
| 8,534,934 B1 * | 9/2013 | Carney | F16M 11/02 | 248/178.1 |
| 8,721,199 B1 * | 5/2014 | Hart | F16M 11/045 | 396/428 |
| 8,739,313 B2 | 6/2014 | Teetzel et al. | | |
| 8,915,660 B1 * | 12/2014 | Ben Yehuda | F16M 11/041 | 396/420 |
| 9,013,297 B1 * | 4/2015 | Dey | A42B 3/046 | 340/539.11 |
| 9,116,355 B2 * | 8/2015 | Teetzel | G02B 23/16 | |
| 9,185,902 B1 * | 11/2015 | Mazzei, Sr. | F16M 11/14 | |
| 9,210,963 B1 * | 12/2015 | Ellis | A42B 3/30 | |
| 9,243,741 B1 * | 1/2016 | Chu | G06F 16/583 | |
| 9,507,245 B1 * | 11/2016 | Druker | G03B 17/566 | |
| 9,532,474 B2 * | 12/2016 | Gutschenritter | H05K 5/0221 | |
| 9,709,792 B2 * | 7/2017 | Teetzel | G02B 23/18 | |
| 9,970,590 B1 * | 5/2018 | Kuo | F16M 11/10 | |
| 2002/0120979 A1 * | 9/2002 | Prendergast | A42B 3/04 | 2/422 |
| 2003/0122958 A1 * | 7/2003 | Olita | A42B 3/042 | 348/373 |
| 2004/0181855 A1 * | 9/2004 | Prendergast | A42B 3/04 | 2/422 |
| 2006/0126013 A1 * | 6/2006 | Himmele | A42B 3/0406 | 351/158 |
| 2007/0067894 A1 * | 3/2007 | Bourree | F41G 1/32 | 2/422 |
| 2008/0272868 A1 * | 11/2008 | Prendergast | A42B 3/042 | 335/207 |
| 2008/0317263 A1 * | 12/2008 | Villarreal, Jr. | A42B 3/30 | 381/120 |
| 2010/0005636 A1 * | 1/2010 | Liao | A42B 3/04 | 24/652 |
| 2010/0083413 A1 * | 4/2010 | McGovern | A42B 3/04 | 2/6.6 |
| 2011/0145981 A1 * | 6/2011 | Teetzel | A42B 3/04 | 2/422 |
| 2011/0239354 A1 * | 10/2011 | Celona | A42B 3/04 | 2/422 |
| 2012/0182748 A1 * | 7/2012 | McCaslin | A42B 3/044 | 362/473 |
| 2013/0086722 A1 * | 4/2013 | Teetzel | F41H 1/04 | 2/2.5 |
| 2013/0104297 A1 * | 5/2013 | Silva | A42B 3/0453 | 2/422 |
| 2014/0000013 A1 * | 1/2014 | Redpath | A42B 3/04 | 2/422 |
| 2014/0020159 A1 * | 1/2014 | Teetzel | A42B 3/04 | 2/422 |
| 2014/0084120 A1 * | 3/2014 | Solinsky | A42B 3/04 | 248/227.1 |
| 2015/0063795 A1 * | 3/2015 | Orton | F16M 11/00 | 396/425 |
| 2015/0137760 A1 * | 5/2015 | Yang | F16M 11/041 | 320/115 |
| 2015/0359114 A1 * | 12/2015 | Yang | F16M 11/041 | 248/161 |
| 2016/0230921 A1 * | 8/2016 | Fan | F16M 11/105 | |
| 2016/0348835 A1 * | 12/2016 | Blalock | F16M 13/022 | |
| 2017/0150765 A1 * | 6/2017 | Huang | A42B 1/245 | |
| 2018/0059515 A1 * | 3/2018 | Greenthal | G03B 17/561 | |
| 2018/0084160 A1 * | 3/2018 | Miyashita | H04N 5/2252 | |
| 2018/0168265 A1 * | 6/2018 | Sengupta | G08B 25/009 | |
| 2018/0192727 A1 * | 7/2018 | Chen | A42B 3/0406 | |
| 2018/0206016 A1 * | 7/2018 | Nugent | F16M 13/022 | |
| 2018/0206576 A1 * | 7/2018 | Dextraze | A42B 3/04 | |
| 2018/0206577 A1 * | 7/2018 | Dextraze | A42B 3/04 | |
| 2018/0256925 A1 * | 9/2018 | Sommers | A61F 9/068 | |
| 2018/0321573 A1 * | 11/2018 | Prichard | G03B 17/561 | |

\* cited by examiner

HELMET

CROSS-REFERENCE TO RELATED APPLICATIONS

This application is based upon and claims priority under 35 U.S.C. 119 from Taiwan Patent Application No. 106119887 filed on Jun. 14, 2017, which is hereby specifically incorporated herein by this reference thereto.

BACKGROUND OF THE INVENTION

1. Field of the Invention

The present invention relates protective equipment worn to protect head, especially to a helmet that is assembled with a variety of equipments.

2. Description of the Prior Art(s)

A helmet is worn to protect a user's head from injuries. For instance, a bicycle rider or a motorcycle rider wears the helmet and the helmet can protect the rider's head during impact. Moreover, as for popular outdoor activities, such as extreme sports or shooting sports, a player also has to wear protective equipment including the helmet, so as to prevent the player's head from being injured during fast moving or chasing.

In order to record videos when doing the afore-mentioned outdoor activities, a helmet camera has to be mounted on the helmet. The helmet camera records the videos so as to allow people to watch afterwards or for other reasons. However, the helmet camera is mounted on a conventional helmet via a fastening device. A structure of the fastening device of the conventional helmet is complicated and bulky and is inconvenient to adjust filming angles of the helmet camera.

To overcome the shortcomings, the present invention provides a helmet to mitigate or obviate the aforementioned problems.

SUMMARY OF THE INVENTION

The main objective of the present invention is to provide a helmet that has a simplified and compact structure. Except protecting a user's head, the helmet also allows a camera to be easily mounted on the helmet and to be easily adjusted and operated so as to record videos.

The helmet has a cap, a turning assembly, and a fastening device.

The turning assembly is assembled on the cap and has a main base, two arms, a swing seat, and two guiding rods. The main base is securely mounted on the cap. Each of the arms has a first end pivotally connected to the main base and a second end. The swing seat is pivotally connected to the second ends of the arms and has a front portion and a rear portion pivotally connected to the second ends of the arms. The guiding rods are parallelly mounted on the front portion of the swing seat. Each of at least one of the guiding rods has multiple engaging recesses formed in an outer surface of the guiding rod and spaced at intervals.

The fastening device is assembled on the guiding rods and has a lower holder, an upper holder, a locking member, a pivot rod, a first resilient element, a locking panel, a pivot shaft, and a second resilient element. The lower holder has two mounting holes and a positioning notch. The mounting holes are respectively formed through two opposite side portions of the lower holder and extend parallel to each other. The positioning notch is formed through one of the side portions of the connecting lower holder to divide said side portion into two parts, and communicates with the mounting hole that is formed in the same side portion. The guiding rods are respectively mounted through the mounting holes of the lower holder. One of the at least one of the guiding rods that has the engaging recesses is mounted in the mounting holes that communicates with the positioning notch. The positioning notch of the lower holder corresponds in position to one of the engaging recesses of the guiding rod. The upper holder is securely attached to the lower holder. A receiving chamber is defined between the lower holder and the upper holder. The locking member is pivotally mounted in the positioning notch of the lower holder and has an engaging protrusion and an abutting protrusion. The engaging protrusion protrudes from a side surface of the locking member and selectively engages in one of the engaging recesses of a corresponding one of the guiding rods. The abutting protrusion of the locking member protrudes from an end surface of the locking member toward the lower holder. The first resilient element has two ends respectively abutting against the lower holder and the abutting protrusion of the locking member. The locking panel is pivotally mounted on the upper holder and has a locking protrusion protruding from an inner surface of the locking panel, disposed adjacent to an end of the locking panel, and extending toward the receiving chamber. The second resilient element is mounted between another end of the locking panel and the upper holder and pushes the locking panel to allow the locking protrusion of the locking panel to protrude toward the receiving chamber.

The helmet is formed as an integral whole and has a simplified and compact structure. The camera is mounted to the fastening device. The locking panel of the fastening device allows the camera to be easily and quickly mounted onto the cap via the fastening device or removed from the fastening device. With the locking member engaging in or disengaging from the engaging recesses of the guiding rod of the turning assembly, a position of the camera relative to the cap can be also easily and quickly adjusted.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
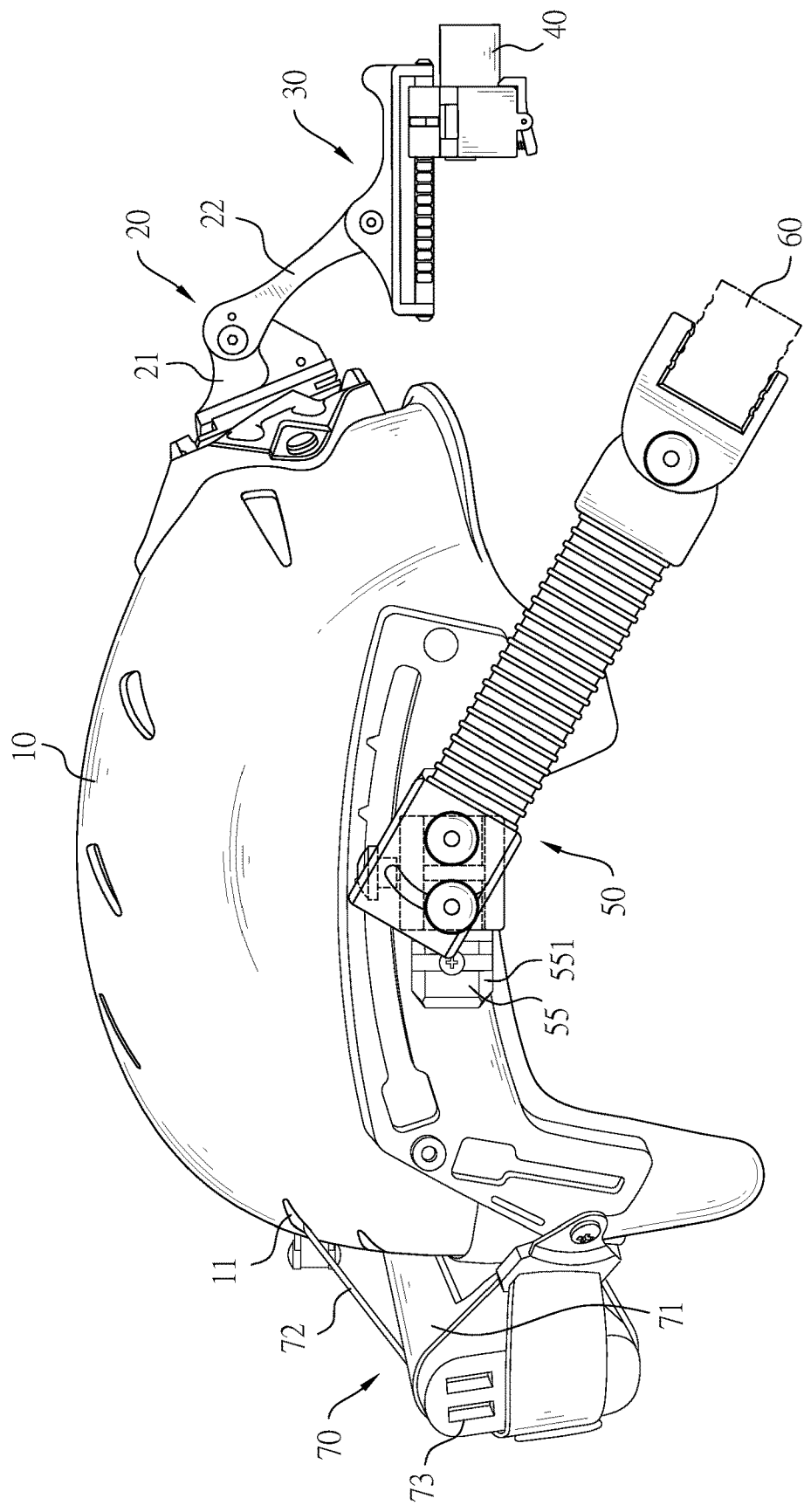
FIG. 1 is a side view of a helmet in accordance with the present invention.
Figure 2:
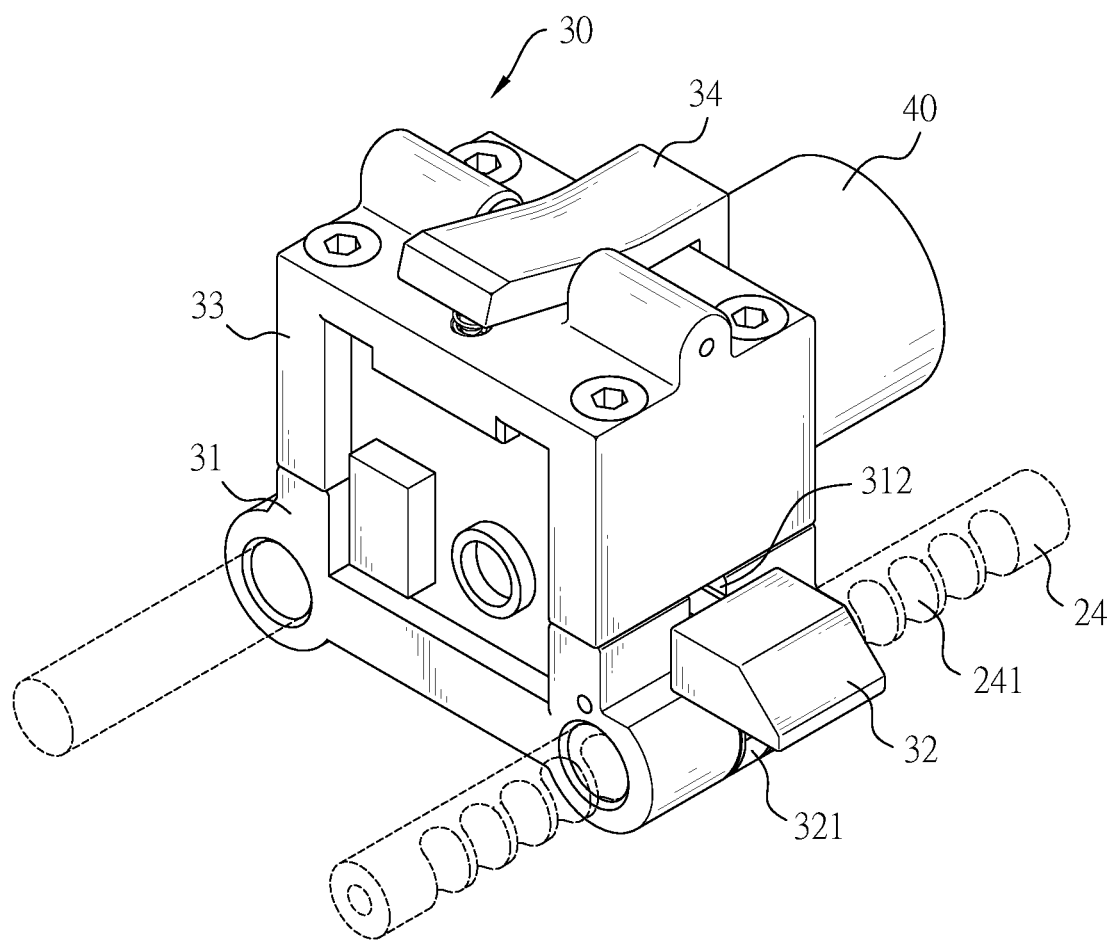
FIG. 2 is a perspective view of a fastening device of the helmet in FIG. 1.
Figure 3:
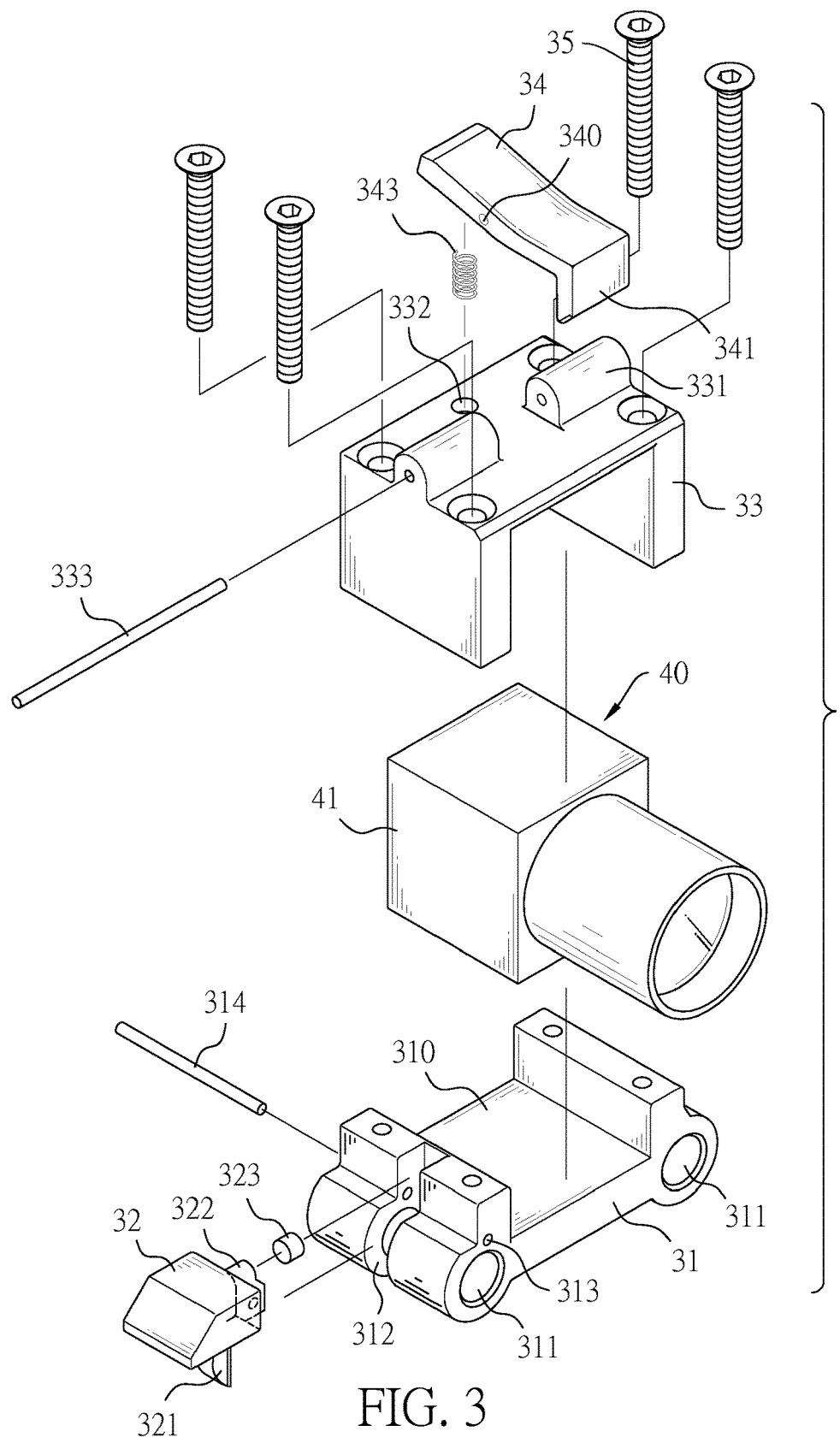
FIG. 3 is an exploded perspective view of the fastening device in FIG. 2.

With reference to FIG. 1, a helmet in accordance with the present invention comprises a cap 10, a turning assembly 20, a fastening device 30, a camera 40, a supporting device 50, and a battery set 70.

The cap 10 is a hollow shell, is used for covering a user's head and has multiple through holes 11 separately formed through the cap 10.

Figure 7:
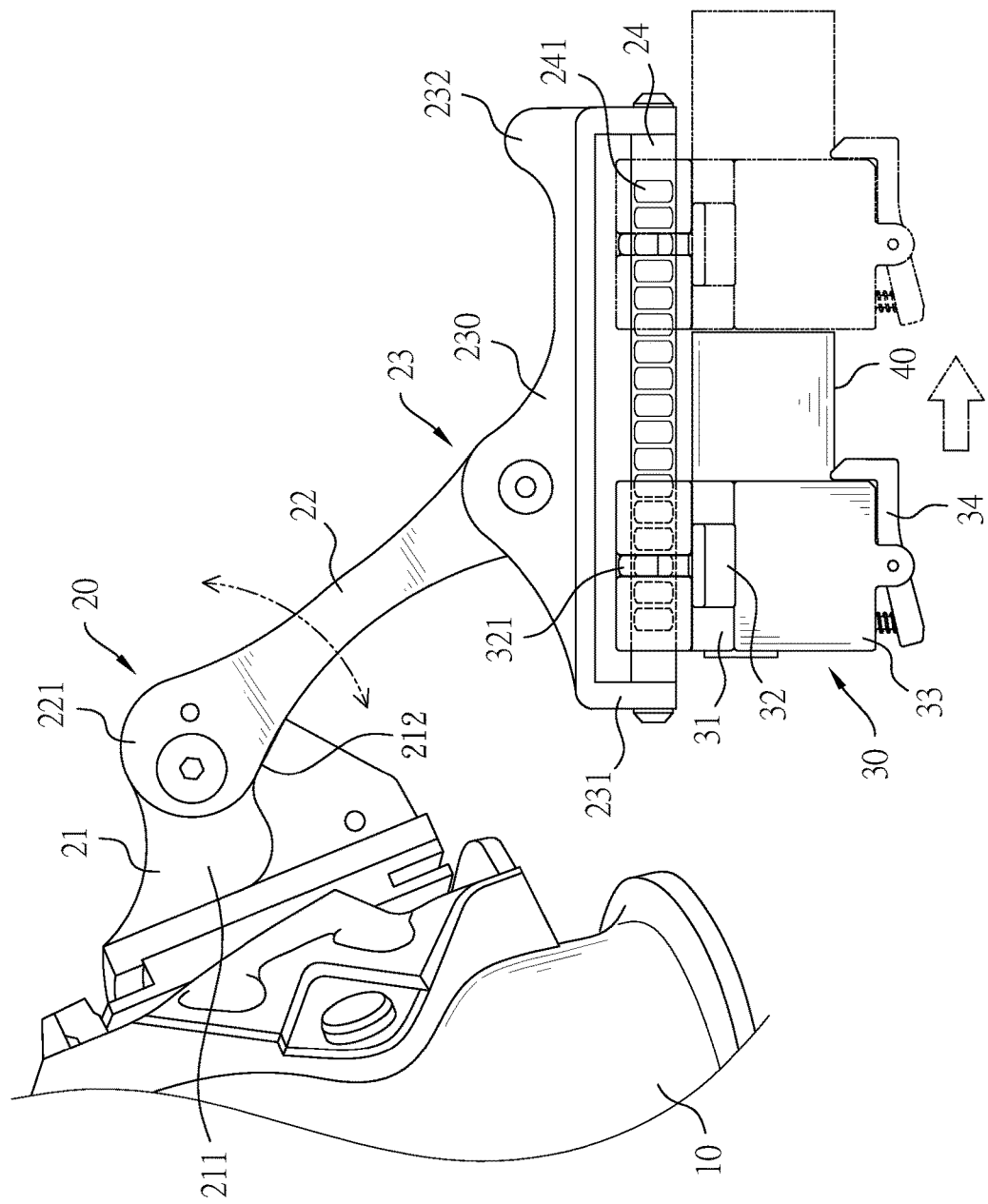
FIG. 7 is an enlarged operational side view of the helmet in FIG. 1, showing the camera being in use.

With further reference to FIG. 7, the turning assembly 20 is assembled on the cap 10 and has a main base 21, two arms 22, a swing seat 23, and two guiding rods 24.

The main base 21 is securely mounted on the cap 10, is disposed outside the cap 10, and has two end surfaces, two mounting recesses 211, two recess walls, and two abutting portions 212. One of the end surfaces of the main base 21 is securely attached to the cap 10. The mounting recesses 211 are separately formed in the other end surface of the main base 21. The recess walls are respectively defined in the mounting recesses 211. The abutting portions 212 are respectively formed on the recess walls of the main base 21.

Each of the arms 22 has a first end, a second end, and a propping portion 221. The first end of the arm 22 is pivotally connected to the main base 21. Specifically, the first end of the arm 22 is mounted in a corresponding one of the mounting recesses 211 of the main base 21, is eccentrically connected pivotally to the main base 21, and has a first side and a second side. The propping portion 221 is defined on the first side of the first end of the arm 22 and selectively abuts against the abutting portion 212 that is formed in the corresponding one of the mounting recesses 211.

Figure 8:
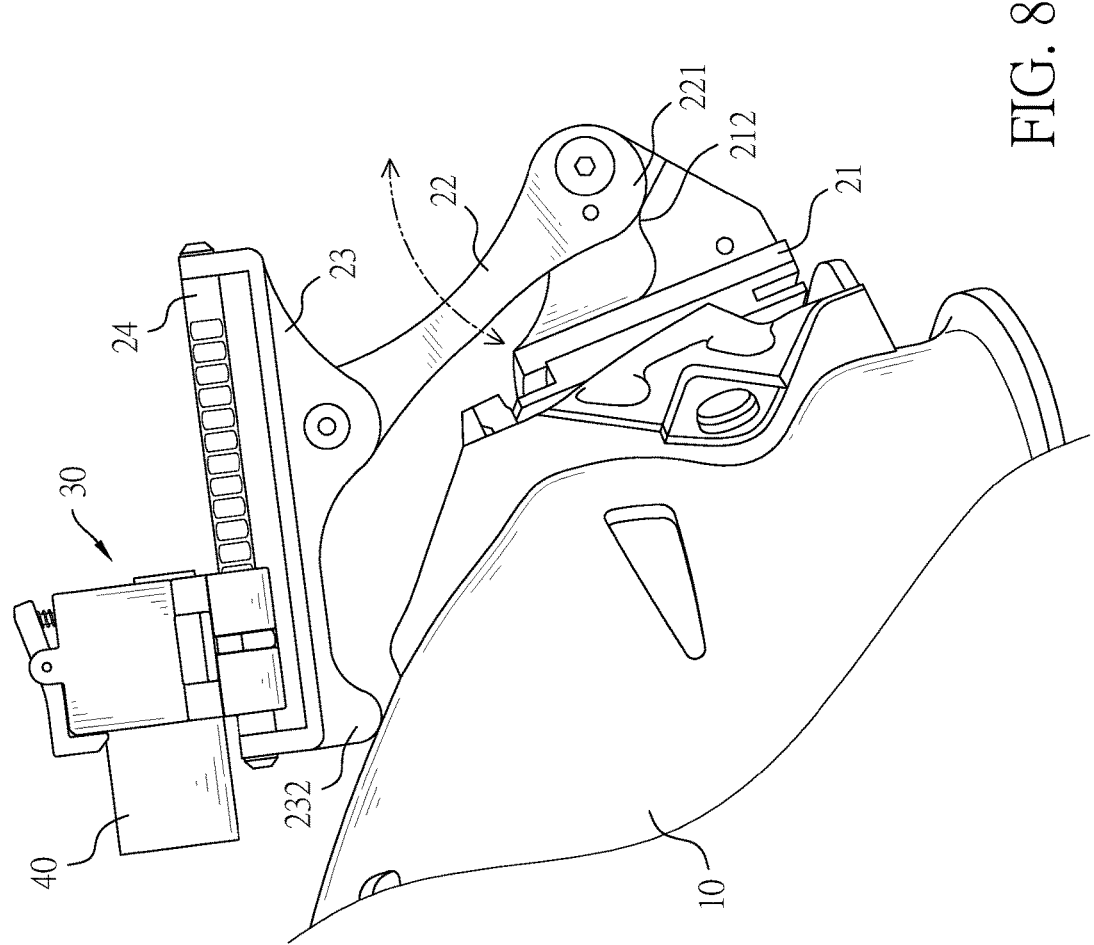
FIG. 8 is an enlarged operational side view of the helmet in FIG. 1, showing the camera being not in use.

As shown in FIG. 7, the abutting portion 212 of the main base 21 may abut against the second side of the first end of the arm 22 when the arm 22 is unfolded relative to the main base 21. With further reference to FIG. 8, the abutting portion 212 of the main base 21 may abut against the propping portion 221 on the first side of the first end of the arm 22 when the arm 22 is folded relative to the main base 21.

The swing seat 23 is pivotally connected to the second ends of the arms 22 and has a front portion and a rear portion. The rear portion of the swing seat 23 is opposite to the front portion of the swing seat 23 and is pivotally connected to the second ends of the arms 22.

Specifically, the swing seat 23 has a two side panels 230 and two rod mounts 231. The side panels 230 separately protrude from the rear portion of the swing seat 23 and are respectively connected pivotally to the second ends of the arms 22. Thus, the swing seat 23 is able to pivot relative to the arms 22 and the main base 21, so as to be folded or unfolded. Each of the side panels 230 has an abutting portion 232 formed on an end of the side panel 230. The abutting protrusion 232 of the swing seat 23 abuts against the cap 10 when the swing seat 23 is folded. The rod mounts 231 are separately formed on the front portion of the swing seat 23.

The guiding rods 24 are parallelly mounted on the front portion of the swing seat 23. Each of at least one of the guiding rods 24 has multiple engaging recesses 241. The engaging recesses 241 are formed in an outer surface of the guiding rod 24 and are spaced at intervals. Specifically, the guiding rods 24 are parallelly disposed between the rod mounts 231. Each of the guiding rods 24 has two ends respectively connected to the rod mounts 231.

The fastening device 30 is assembled on the guiding rods 24 and has a lower holder 31, an upper holder 33, a locking member 32, a pivot rod 314, a first resilient element 323, a locking panel 34, a pivot shaft 333, and a second resilient element 343.

The lower holder 31 has two opposite side portions, two mounting holes 311, a positioning notch 312, and an axial hole 313. The mounting holes 311 are respectively formed through the side portions of the lower holder 31 and extend parallel to each other. The positioning notch 312 are formed through one of the side portions of the connecting lower holder 31 to divide said side portion into two parts, and communicates with the mounting hole 311 that is formed in the same side portion. The axial hole 313 of the lower holder 31 is formed in and through the side portion that has the positioning notch 312, extends perpendicular to the positioning notch 312, and extends parallel to and communicates with the mounting hole 311 that is formed in the same side portion.

The guiding rods 24 are respectively mounted through the mounting holes 311 of the lower holder 31. One of the at least one of the guiding rods 24 that has the engaging recesses 241 is mounted in the mounting holes 311 that communicates with the positioning notch 312. The positioning notch 312 of the lower holder 31 corresponds in position to one of the engaging recesses 241 of the guiding rod 24.

The upper holder 33 is securely attached to the lower holder 31 via multiple fasteners 35. A receiving chamber 310 is defined between the lower holder 31 and the upper holder 33. The upper holder 33 has an outer surface, an inner surface, an inner stop 330, a pivot seat 331 and an indentation 332. The inner surface of the upper holder 33 faces the receiving chamber 310. The inner stop 330 protrudes from the inner surface of the upper holder 33. The pivot seat 331 is formed on the outer surface of the upper holder 33 and has a mounting notch and an axial hole. The mounting notch is formed through the pivot seat 331 to divide the pivot seat 331 into two parts. The axial hole of the pivot seat 331 is formed in and through the pivot seat 331 and extends perpendicular to the mounting notch of the pivot seat 331. The indentation 332 is formed in the outer surface of the upper holder 33.

Figure 4:
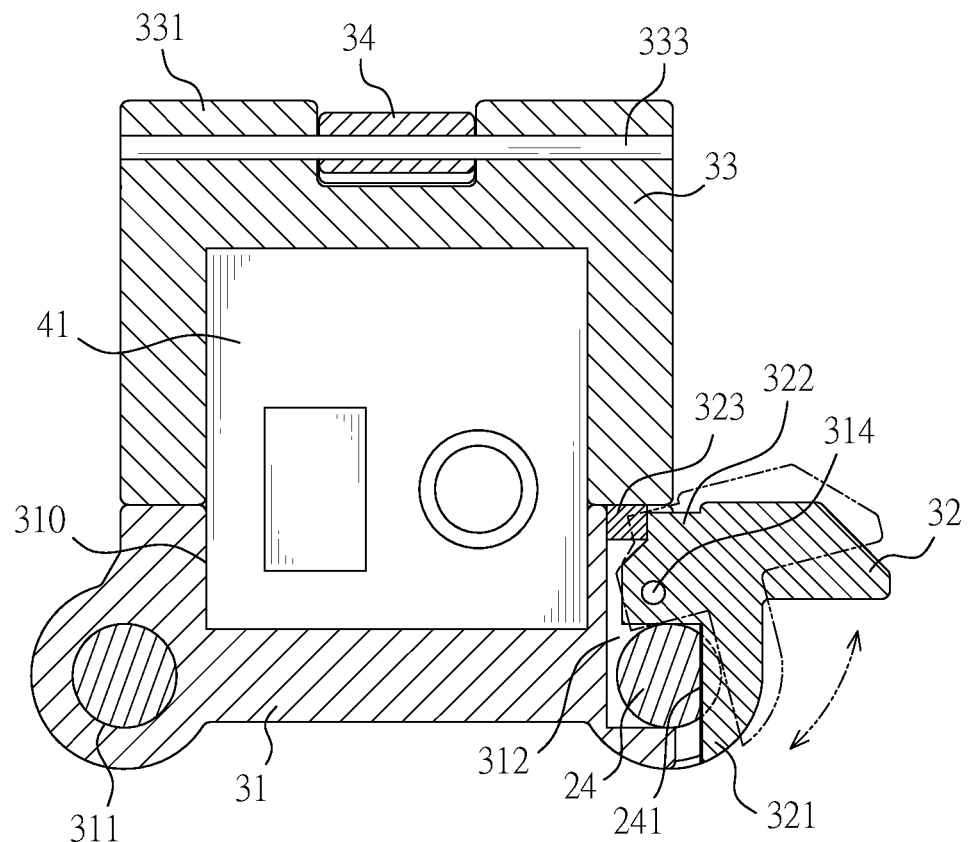
FIG. 4 is an operational side view in partial section of the fastening device in FIG. 2.
Figure 5:
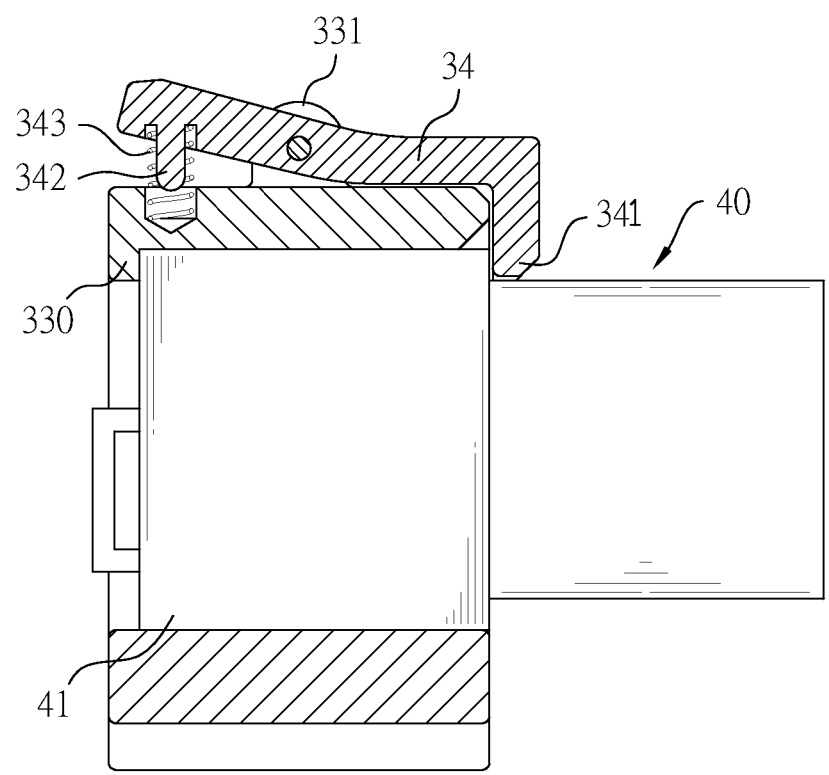
FIG. 5 is another side view in partial section of the fastening device in FIG. 2, showing a camera mounted on the fastening device.

With further reference to FIGS. 4 and 5, the locking member 32 is pivotally mounted in the positioning notch 312 of the lower holder 31 and has a side surface, an end surface, an engaging protrusion 321, and an abutting protrusion 322. The engaging protrusion 321 protrudes from the side surface of the locking member 32, is disposed in the positioning notch 312, and selectively engages in one of the engaging recesses 241 of a corresponding one of the guiding rods 24. The abutting protrusion 322 of the locking member 32 protrudes from the end surface of the locking member 32 toward the lower holder 31.

The pivot rod 314 of the fastening device 30 is mounted through the axial hole 313 of the lower holder 31 and the locking member 32, such that the locking member 32 is able to pivot relative to the lower holder 31.

The first resilient element 323 is mounted in the positioning notch 312 and has two ends respectively abutting against the lower holder 31 and the abutting protrusion 322 of the locking member 32. Thus, the first resilient element 323 pushes the locking member 32 to allow the engaging protrusion 321 of the locking member 32 to engage in one of the engaging recesses 241 of the guiding rod 24.

As shown in FIG. 4, when the locking member 32 is pushed to pivot to allow the engaging protrusion 321 to disengage from the engaging recesses 241 of the guiding rod 24, the first resilient element 323 is compressed. When the locking member 32 is released, the first resilient element 323 pushes the locking member 32 to pivot reversely, so as to allow the engaging protrusion 321 of the locking member 32 to engage in one of the engaging recesses 241 of the guiding rod 24.

The locking panel 34 is elongated, is pivotally mounted on the upper holder 33, is mounted through the mounting notch of the pivot seat 331 of the upper holder 33, and has a first end, a second end, an inner surface, an axial hole 340, a locking protrusion 341, and a mounting protrusion 342. The first end of the locking panel 34 corresponds in position to the inner stop 330 of the upper holder 33. The second end of the locking panel 34 is defined opposite to the first end of the locking panel 34. The inner surface of the locking panel 34 faces the upper holder 33. The axial hole 340 of the locking panel 34 is formed in and through the locking panel 34 and aligns with the axial hole of the pivot seat 331 of the upper holder 33. The locking protrusion 341 protrudes from the inner surface of the locking panel 34, is disposed adjacent to the second end of the locking panel 34, and extends toward the receiving chamber 310. Thus, the locking protrusion 341 and the inner stop 330 of the upper holder 33 are respectively disposed at two opposite sides of the receiving chamber 310. The mounting protrusion 342 protrudes from the inner surface of the locking panel 34, is disposed adjacent to the first end of the locking panel 34, and corresponds in position to and protrudes toward the indentation 332 of the upper holder 33.

The pivot shaft 333 is mounted through the axial hole of the pivot seat 331 of the upper holder 33 and the axial hole 340 of the locking panel 34, such that the locking panel 34 is able to pivot relative to the upper holder 33.

Figure 6:
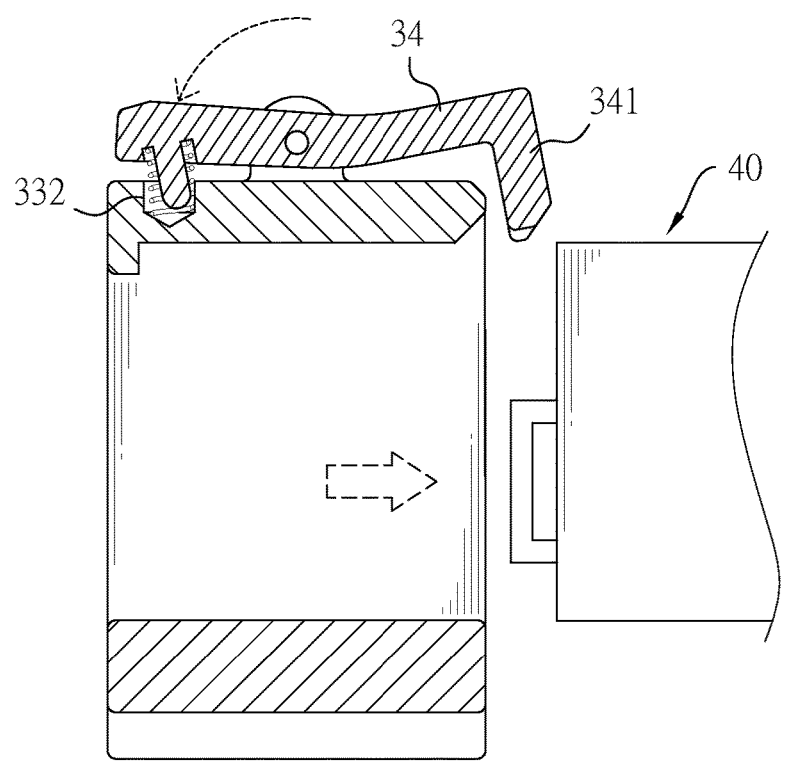
FIG. 6 is another side view in partial section of the fastening device in FIG. 2, showing the camera detached from the fastening device.

The second resilient element 343 is mounted between the first end of the locking panel 34 and the upper holder 33, pushes the first end of the locking panel 34 to depart from the upper holder 33 and to allow the second end of the locking panel 34 to move toward the upper holder 33, such that the locking protrusion 341 of the locking panel 34 protrudes toward the receiving chamber 310. Specifically, the second resilient element 343 is mounted around the mounting protrusion 342 of the locking panel 34 and has two ends. One of the ends of the second resilient element 343 abuts against the locking panel 34, and the other end of the second resilient element 343 protrudes into the indentation 332 of the upper holder 33 and abuts against the upper holder 33. With further reference to FIG. 6, when the first end of the locking panel 34 is pressed, the second resilient element 343 is compressed, and the locking protrusion 341 and the second end of the locking panel 34 are moved away from the upper holder 33.

The camera 40 has a main body 41. The main body 41 of the camera 40 is mounted in the receiving chamber 310 of the fastening device 30 and is held between the inner stop 330 of the upper holder 33 and the locking protrusion 341 of the locking panel 34. As shown in FIG. 6, when the first end of the locking panel 34 is pressed and the locking protrusion 341 of the locking panel 34 is moved away from the receiving chamber 310, the main body 41 of the camera 40 is able to be removed from the receiving chamber 310 of the fastening device 30. Thus, the camera 40 can be easily and quickly connected or disconnected with the fastening device 30.

With further reference to FIG. 7, when the helmet of the present invention is in use, the cap 10 is worn on the head of the user and the camera 40 is turned to face toward a front of the user by turning the arms 22 and the swing seat 23 of the turning assembly 20, so as to record all kinds of information around the user. As shown in FIG. 4, when the user intends to adjust a position of the camera 40 relative to the cap 10, the locking member 32 is pushed to allow the engaging protrusion 321 of the locking member 32 to disengage from the engaging recesses 241 of the guiding rod 24. Thus, the fastening device 30 is able to be moved along the guiding rods 24. When the fastening device 30 is moved to a desired position, the locking member 32 is released, so as to allow the engaging protrusion 321 of the locking member 32 to engage in a corresponding one of the engaging recesses 241 of the guiding rod 24.

With further reference to FIG. 8, when the user does not want to use the camera 40, the arms 22 and the swing seat 23 of the turning assembly 20 are turned relative to the main base 21 toward the cap 10 to allow the propping portions 221 of the arms 22 to abut against the abutting portions 212 of the main base 21 and the abutting portions 232 of the swing seat 23 to abut against the cap 10.

Figure 9:
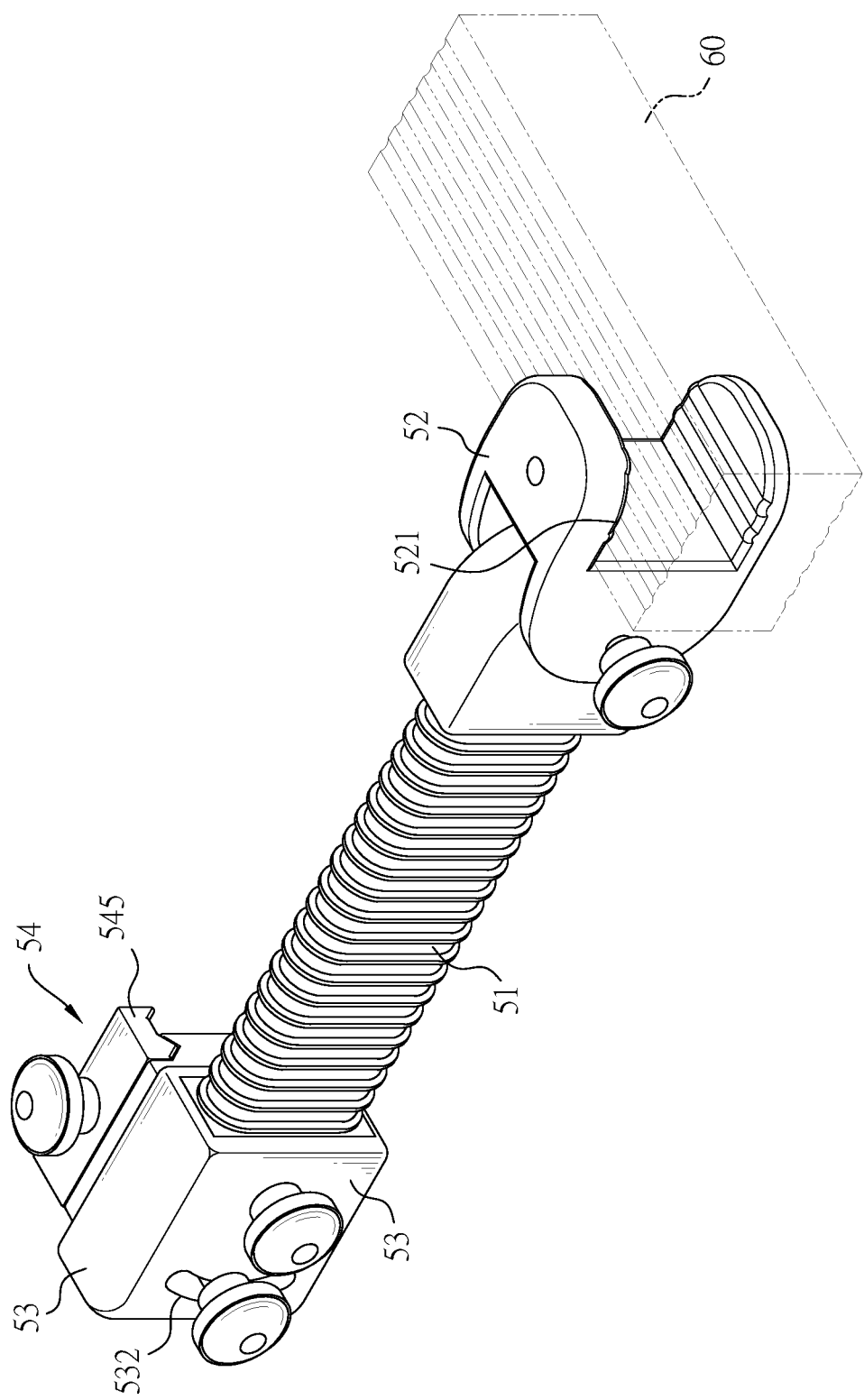
FIG. 9 is a perspective view of a supporting device of the helmet in FIG. 1.

With further reference to FIGS. 1 and 9, the supporting device 50 is assembled on the cap 10 and has a connecting end and a mounting end. The connecting end of the supporting device 50 is connected to the cap 10. The mounting end of the supporting device 50 is for mounting a display apparatus 60.

Figure 10:
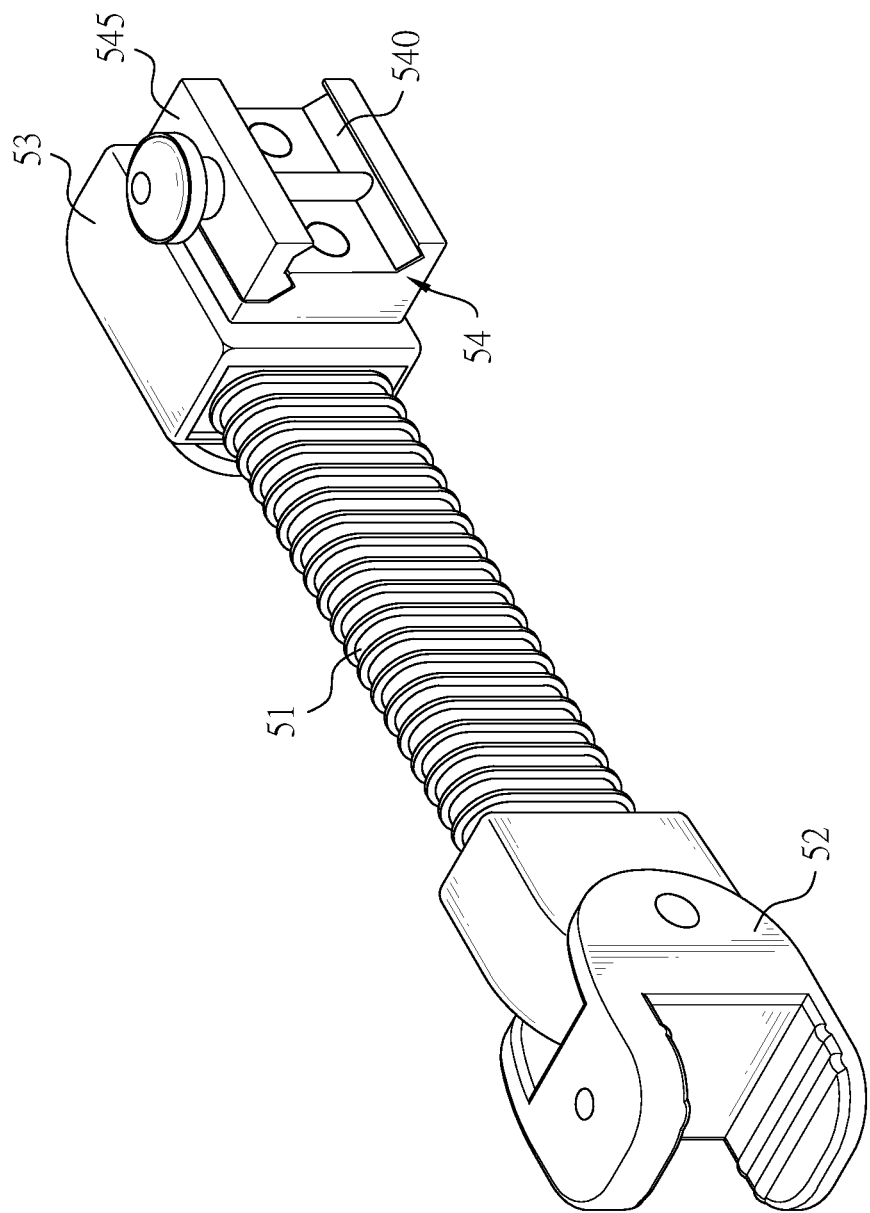
FIG. 10 is another perspective view of the supporting device in FIG. 9.
Figure 11:
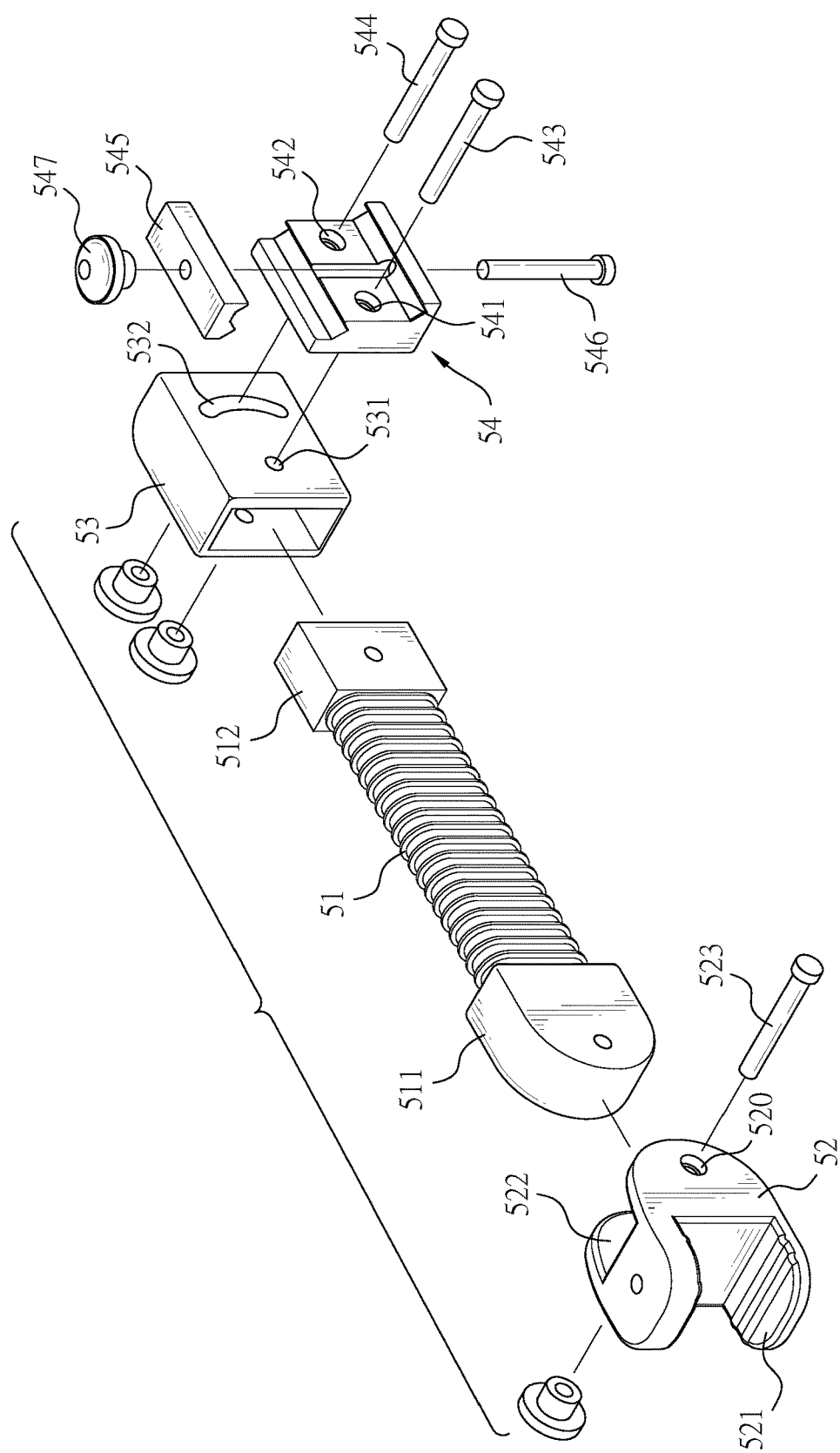
FIG. 11 is an exploded perspective view of the supporting device in FIG. 9.

With further reference to FIGS. 10 and 11, the supporting device 50 includes a flexible rod 51, a mounting base 52, a pivot rod 523, a swing base 53, a holding base 54, and a positioning panel 55.

The flexible rod 51 has a first end 511 end and a second end 512. The first end 511 of the flexible rod 51 is arcuate.

The mounting base 52 is pivotally mounted on the first end 511 of the flexible rod 51 and has an outer end, an inner end, a holding recess 521, a pivot hole 520, and a connecting recess 522. The holding recess 521 of the mounting base 52 is formed in the outer end of the mounting base 52 and is for receiving and holding the display apparatus 60. The pivot hole 520 of the mounting base 52 is formed through the inner end of the mounting base 52. The connecting recess 522 is formed in the inner end of the mounting base 52 and is for receiving the first end 511 of the flexible rod 51. The pivot rod 523 is mounted through the pivot hole 520 of the mounting base 52 and the first end 511 of the flexible rod 51 and is combined with a nut, such that the mounting base 52 is able to be turned relative to the first end 511 of the flexible rod 51 or be securely held on the first end 511 of the flexible rod 51.

Figure 12:
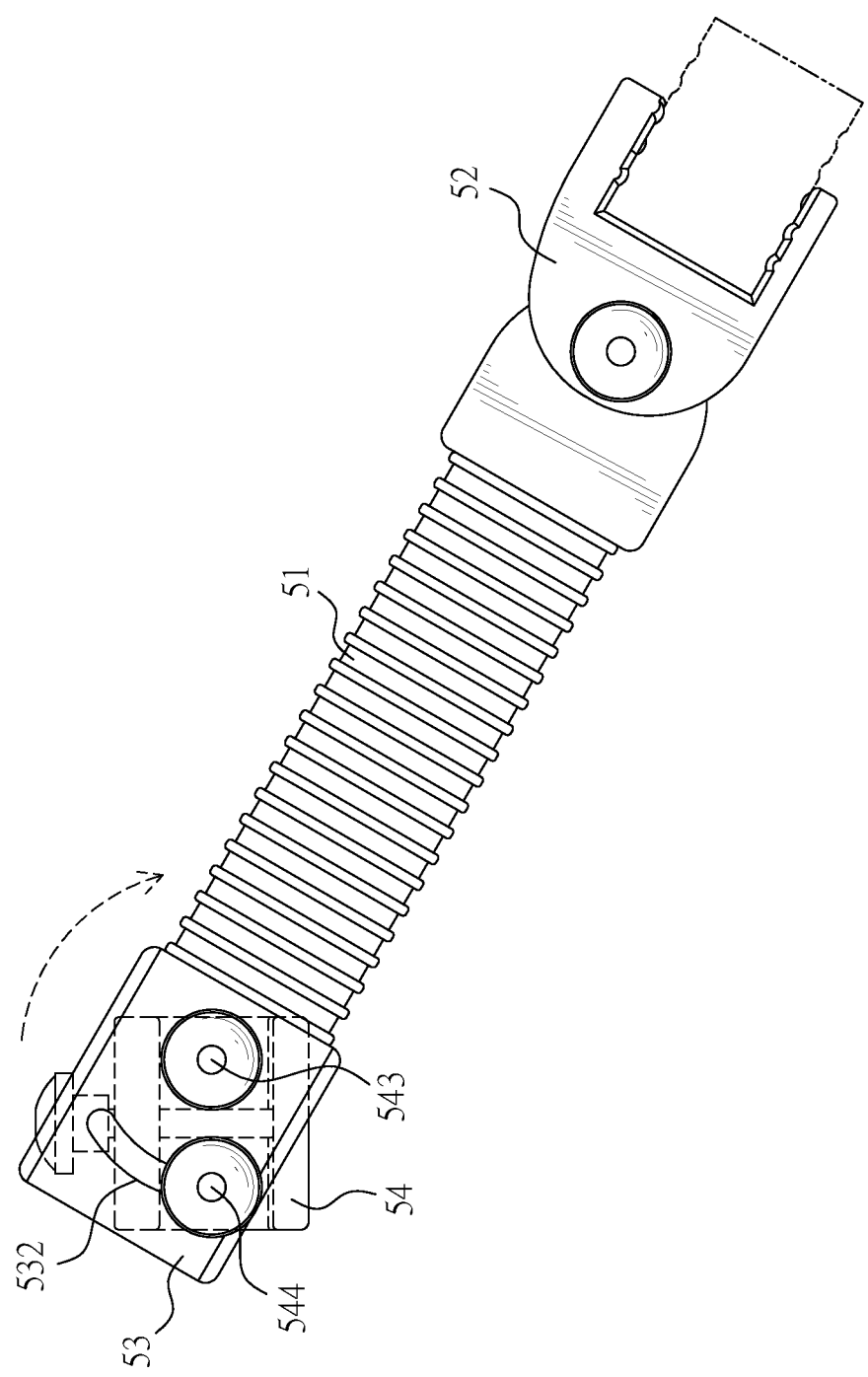
FIG. 12 is an operational side view of the supporting device in FIG. 9.

With further reference to FIGS. 11 and 12, the swing base 53 is pivotally mounted on the second end 512 of the flexible rod 51 and has an elongated hole 532 and a pivot hole 531. The elongated hole 532 is arced and is formed through the swing base 53. The pivot hole 531 of the swing base 53 is formed through the swing base 53 and is disposed at a center of curvature of the elongated hole 532. Specifically, the swing base 53 is hollow and the second end 512 of the flexible rod 51 is mounted in the swing base 53.

The holding base 54 is mounted on the swing base 53 and has a base mount, a first pivot shaft 543, a second pivot shaft 544, a clamping panel 545, and a bolt 546.

The base mount is mounted on the swing base 53 and has a pivot hole 541 and a through hole 542. The pivot hole 541 of the base mount is formed through the base mount and aligns with the pivot hole 531 of the swing base 53. The through hole 542 of the base mount is formed through the base mount and aligns with the elongated hole 532 of the swing base 53.

The first pivot shaft 543 is mounted through the pivot hole 541 of the base mount, the pivot hole 531 of the swing base 53, and the second end 512 of the flexible rod 51. Thus, the base mount, the swing base 53, and the second end 512 of the flexible rod 51 are combined together and the holding base 54 is able to be turned relative to the swing base 53. The second pivot shaft 544 is mounted through the through hole 542 of the base mount and the elongated hole 532 of the swing base 53, such that the swing base 53 is able to be turned relative to the holding base 54 or be securely held on the holding base 54.

The clamping panel 545 is mounted on a side of the base mount. The bolt 546 is mounted through the base mount and the clamping panel 545 and is combined with a nut 547. A clamping recess 540 is defined between the base mount and the clamping panel 545. By adjusting positions of the nut 547 on the bolt 546, a width of the clamping recess 540 can be adjusted.

Figure 13:
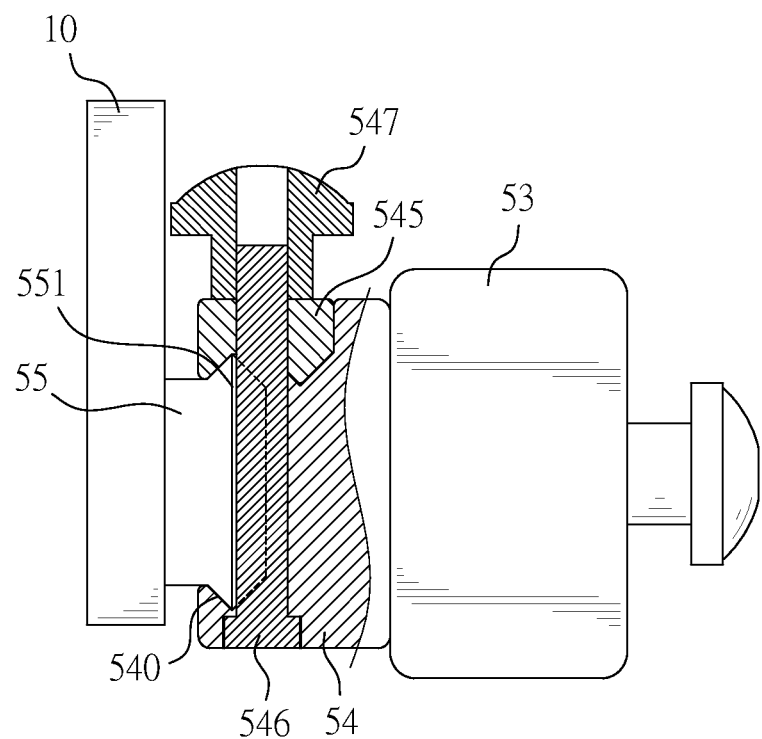
FIG. 13 is an operational end view in partial section of the supporting device in FIG. 9.
Figure 14:
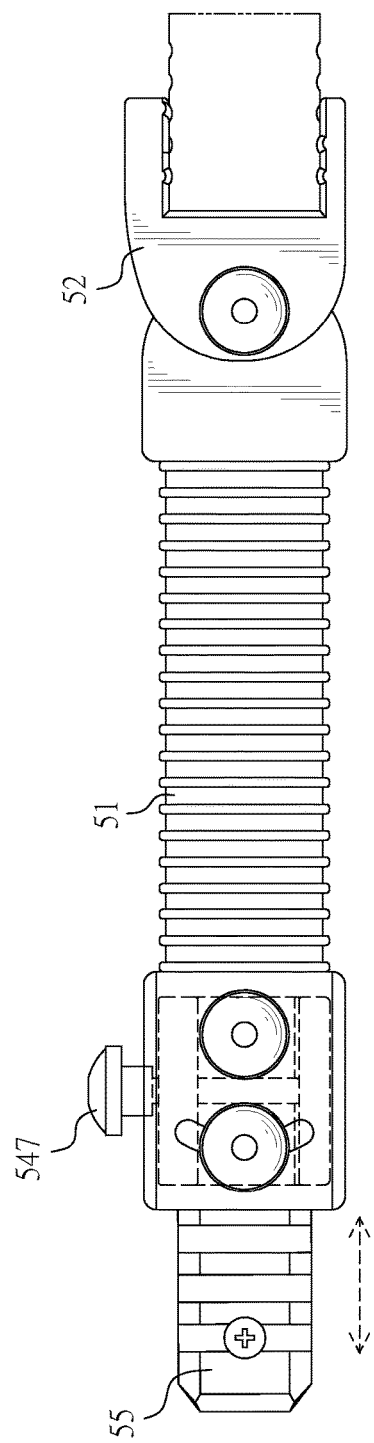
FIG. 14 is another operational side view of the supporting device in FIG. 9.

With further reference to FIGS. 1, 11, and 13, the positioning panel 55 is elongated, is securely mounted on the cap 10, and is disposed outside the cap 10. The positioning panel 55 is mounted through the clamping recess 540 and is selectively held by the clamping panel 545 and the base mount of the holding base 54. With further reference to FIG. 14, when the holding base 54 is moved to a specific position on the positioning panel 55, the bolt 546 and the nut 547 on the bolt 546 can be turned to reduce the width of the clamping recess 540. Thus, the positioning panel 55 is securely held by the clamping panel 545 and the base mount of the holding base 54, and a position of the holding base 54 on the positioning panel 55 is fixed. Otherwise, the bolt 546 and the nut 547 on the bolt 546 can be turned to enlarge the width of the clamping recess 540, such that the position of the holding base 54 on the positioning panel 55 can be adjusted.

Specifically, the positioning panel 55 has an upper side, a lower side, two engaging ribs 551. The engaging ribs 551 respectively protrude from the upper side and the lower side of the positioning panel 55 and respectively engage with the clamping panel 545 and the base mount of the holding base 54.

As shown in FIG. 1, the battery set 70 is assembled on the cap 10 and is used for providing electric power. The battery set 70 includes a bag 71 and a fixing element 72. The bag 71 is for mounting a battery 73. The fixing element 72 is connected to the bag 71 and is connected to the cap 10 through at least one of the through holes 11 of the cap 10, so as to connect the bag 71 to the cap 10.

The helmet as described has the following advantages. The locking panel 34 of the fastening device 30 allows the camera 40 to be easily and quickly mounted onto the cap 10 via the fastening device 30 or removed from the fastening device 30. With the locking member 32 engaging in or disengaging from the engaging recesses 241 of the guiding rod 24 of the turning assembly 20, the position of the camera 40 relative to the cap 10 can be also easily and quickly adjusted. Moreover, the supporting device 50 that is assembled on the cap 10 can be used for mounting the display apparatus 60 or other apparatuses. By adjusting relative positions of the swing base 53, the holding base 54, and the positioning panel 55, positions of the display apparatus 60 and said other apparatuses relative to the cap 10 can be adjusted accordingly.

In addition, the camera 40 may be a thermographic camera that forms thermal images with infrared radiation and transfers the thermal images to the display apparatus 60. Thus, the helmet of the present invention can be used to record videos during day and night in all kinds of weather. Furthermore, the battery set 70 provides the electric power to the camera 40 and the display apparatus 60. Thus, the helmet is formed as an integral whole and has a simplified and compact structure.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A helmet comprising:
   a cap being a hollow shell;
   a turning assembly assembled on the cap and having
      a main base securely mounted on the cap;
      two arms, and each of the arms having
         a first end pivotally connected to the main base; and
         a second end;
      a swing seat pivotally connected to the second ends of the arms and having
         a front portion; and
         a rear portion being opposite to the front portion of the swing seat and pivotally connected to the second ends of the arms; and
      two guiding rods parallelly mounted on the front portion of the swing seat, at least one of the guiding rods having multiple engaging recesses, and the engaging recesses formed in an outer surface of the guiding rod and spaced at intervals; and
   a fastening device assembled on the guiding rods and having
      a lower holder having
         two opposite side portions;
         two mounting holes respectively formed through the side portions of the lower holder and extending parallel to each other;
         a positioning notch formed through one of the side portions of the lower holder to divide said side portion into two parts, and communicating with the mounting hole that is formed in the same side portion;
      wherein the guiding rods are respectively mounted through the mounting holes of the lower holder, and the at least the guiding rods that has the engaging recesses is mounted in the mounting holes that communicates with the positioning notch; and
      the positioning notch of the lower holder corresponds in position to the engaging recesses of the guiding rod;
      an upper holder securely attached to the lower holder, wherein a receiving chamber is defined between the lower holder and the upper holder;
      a locking member pivotally mounted in the positioning notch of the lower holder and having
         a side surface;

an end surface;
an engaging protrusion protruding from the side surface of the locking member and selectively engaging in the engaging recesses of the at least the guiding rods; and
an abutting protrusion protruding from the end surface of the locking member toward the lower holder;
a first resilient element having two ends respectively abutting against the lower holder and the abutting protrusion of the locking member;
a locking panel pivotally mounted on the upper holder, and having
a first end;
a second end defined opposite to the first end of the locking panel;
an inner surface facing the upper holder; and
a locking protrusion protruding from the inner surface of the locking panel, disposed adjacent to the second end of the locking panel, and extending toward the receiving chamber; and
a second resilient element mounted between the first end of the locking panel and the upper holder and pushing the first end of the locking panel to allow the locking protrusion on the second end of the locking panel to protrude toward the receiving chamber.

2. The helmet as claimed in claim 1, wherein
the upper holder has an indentation formed in an outer surface of the upper holder;
the locking panel further has a mounting protrusion protruding from the inner surface of the locking panel, disposed adjacent to the first end of the locking panel, and corresponding in position to and protruding toward the indentation of the upper holder; and
the second resilient element is mounted around the mounting protrusion of the locking panel and has two ends, one of the ends of the second resilient element abuts against the locking panel, and the other end of the second resilient element protrudes into the indentation of the upper holder and abuts against the upper holder.

3. The helmet as claimed in claim 2, wherein
the cap has multiple through holes separately formed through the cap; and
the helmet further comprises a battery set assembled on the cap and including
a bag for mounting a battery; and
a fixing element connected to the bag and connected to the cap through at least one of the through holes of the cap.

4. The helmet as claimed in claim 2 further comprising a supporting device assembled on the cap and including:
a flexible rod having a first end and a second end;
a mounting base pivotally mounted on the first end of the flexible rod;
a pivot rod;
a swing base pivotally mounted on the second end of the flexible rod and having
an elongated hole being arced and formed through the swing base; and
a pivot hole formed through the swing base and disposed at a center of curvature of the elongated hole;
a holding base mounted on the swing base and having
a base mount having
a pivot hole formed through the base mount and aligning with the pivot hole of the swing base; and
a through hole formed through the base mount and aligning with the elongated hole of the swing base;
a first pivot shaft mounted through the pivot hole of the base mount, the pivot hole of the swing base, and the second end of the flexible rod;
a second pivot shaft mounted through the through hole of the base mount and the elongated hole of the swing base, wherein the swing base is able to be turned relative to the holding base or be securely held on the holding base;
a clamping panel mounted on a side of the base mount; and
a bolt mounted through the base mount and the clamping panel and combined with a nut, wherein a clamping recess is defined between the base mount and the clamping panel; and
a positioning panel being elongated, securely mounted on the cap, mounted through the clamping recess and selectively held by the clamping panel and the base mount of the holding base.

5. The helmet as claimed in claim 2, wherein
the upper holder further has a pivot seat formed on the outer surface of the upper holder and having
a mounting notch formed through the pivot seat to divide the pivot seat into two parts; and
an axial hole formed in and through the pivot seat and extending perpendicular to the mounting notch of the pivot seat;
the locking panel is mounted through the mounting notch of the pivot seat of the upper holder and further has an axial hole formed in and through the locking panel and aligning with the axial hole of the pivot seat of the upper holder; and
the fastening device further has a pivot shaft mounted through the axial hole of the pivot seat of the upper holder and the axial hole of the locking panel.

6. The helmet as claimed in claim 5, wherein
the cap has multiple through holes separately formed through the cap; and
the helmet further comprises a battery set assembled on the cap and including
a bag for mounting a battery; and
a fixing element connected to the bag and connected to the cap through at least one of the through holes of the cap.

7. The helmet as claimed in claim 5 further comprising a supporting device assembled on the cap and including:
a flexible rod having a first end and a second end;
a mounting base pivotally mounted on the first end of the flexible rod;
a pivot rod;
a swing base pivotally mounted on the second end of the flexible rod and having
an elongated hole being arced and formed through the swing base; and
a pivot hole formed through the swing base and disposed at a center of curvature of the elongated hole;
a holding base mounted on the swing base and having
a base mount having
a pivot hole formed through the base mount and aligning with the pivot hole of the swing base; and
a through hole formed through the base mount and aligning with the elongated hole of the swing base;
a first pivot shaft mounted through the pivot hole of the base mount, the pivot hole of the swing base, and the second end of the flexible rod;

a second pivot shaft mounted through the through hole of the base mount and the elongated hole of the swing base, wherein the swing base is able to be turned relative to the holding base or be securely held on the holding base;

a clamping panel mounted on a side of the base mount; and a bolt mounted through the base mount and the clamping panel and combined with a nut, wherein a clamping recess is defined between the base mount and the clamping panel; and a positioning panel being elongated, securely mounted on the cap, mounted through the clamping recess and selectively held by the clamping panel and the base mount of the holding base.

8. The helmet as claimed in claim 5, wherein the upper holder further has an inner stop protruding from an inner surface of the upper holder.

9. The helmet as claimed in claim 8, wherein the cap has multiple through holes separately formed through the cap; and the helmet further comprises a battery set assembled on the cap and including a bag for mounting a battery; and a fixing element connected to the bag and connected to the cap through at least one of the through holes of the cap.

10. The helmet as claimed in claim 8 further comprising a supporting device assembled on the cap and including:

a flexible rod having a first end and a second end;

a mounting base pivotally mounted on the first end of the flexible rod;

a pivot rod;

a swing base pivotally mounted on the second end of the flexible rod and having an elongated hole being arced and formed through the swing base; and a pivot hole formed through the swing base and disposed at a center of curvature of the elongated hole;

a holding base mounted on the swing base and having a base mount having a pivot hole formed through the base mount and aligning with the pivot hole of the swing base; and a through hole formed through the base mount and aligning with the elongated hole of the swing base;

a first pivot shaft mounted through the pivot hole of the base mount, the pivot hole of the swing base, and the second end of the flexible rod;

a second pivot shaft mounted through the through hole of the base mount and the elongated hole of the swing base, wherein the swing base is able to be turned relative to the holding base or be securely held on the holding base;

a clamping panel mounted on a side of the base mount; and a bolt mounted through the base mount and the clamping panel and combined with a nut, wherein a clamping recess is defined between the base mount and the clamping panel; and a positioning panel being elongated, securely mounted on the cap, mounted through the clamping recess and selectively held by the clamping panel and the base mount of the holding base.

11. The helmet as claimed in claim 8, wherein the main base of the turning assembly has two end surfaces, and one of the end surfaces of the main base securely attached to the cap;

two mounting recesses separately formed in the other end surface of the main base;

two recess walls respectively defined in the mounting recesses; and two abutting portions respectively formed on the recess walls of the main base;

the first end of each of the arms is mounted in a corresponding one of the mounting recesses of the main base, is eccentrically connected pivotally to the main base, and has a first side and a second side; and each of the arms has a propping portion defined on the first side of the first end of the arm and selectively abutting against the abutting portion that is formed in the corresponding one of the mounting recesses.

12. The helmet as claimed in claim 11, wherein the cap has multiple through holes separately formed through the cap; and the helmet further comprises a battery set assembled on the cap and including a bag for mounting a battery; and a fixing element connected to the bag and connected to the cap through at least one of the through holes of the cap.

13. The helmet as claimed in claim 11 further comprising a supporting device assembled on the cap and including:

a flexible rod having a first end and a second end;

a mounting base pivotally mounted on the first end of the flexible rod;

a pivot rod;

a swing base pivotally mounted on the second end of the flexible rod and having an elongated hole being arced and formed through the swing base; and a pivot hole formed through the swing base and disposed at a center of curvature of the elongated hole;

a holding base mounted on the swing base and having a base mount having a pivot hole formed through the base mount and aligning with the pivot hole of the swing base; and a through hole formed through the base mount and aligning with the elongated hole of the swing base;

a first pivot shaft mounted through the pivot hole of the base mount, the pivot hole of the swing base, and the second end of the flexible rod;

a second pivot shaft mounted through the through hole of the base mount and the elongated hole of the swing base, wherein the swing base is able to be turned relative to the holding base or be securely held on the holding base;

a clamping panel mounted on a side of the base mount; and a bolt mounted through the base mount and the clamping panel and combined with a nut, wherein a clamping recess is defined between the base mount and the clamping panel; and a positioning panel being elongated, securely mounted on the cap, mounted through the clamping recess and selectively held by the clamping panel and the base mount of the holding base.

14. The helmet as claimed in claim 11, wherein the swing seat of the turning assembly further has two side panels separately protruding from the rear portion of the swing seat, respectively connected pivotally to the second ends of the arms, and being able to pivot relative to the arms and the main base, and each of the side panels having an abutting portion formed on an end of the side panel; and two rod mounts separately formed on the front portion of the swing seat; and the guiding rods of the turning assembly are parallelly disposed between the rod mounts, and each of the guiding rods has two ends respectively connected to the rod mounts.

15. The helmet as claimed in claim 14 further comprising a supporting device assembled on the cap and including:
a flexible rod having a first end and a second end;
a mounting base pivotally mounted on the first end of the flexible rod;
a pivot rod;
a swing base pivotally mounted on the second end of the flexible rod and having
  an elongated hole being arced and formed through the swing base; and
  a pivot hole formed through the swing base and disposed at a center of curvature of the elongated hole;
a holding base mounted on the swing base and having
  a base mount having
    a pivot hole formed through the base mount and aligning with the pivot hole of the swing base; and
    a through hole formed through the base mount and aligning with the elongated hole of the swing base;
  a first pivot shaft mounted through the pivot hole of the base mount, the pivot hole of the swing base, and the second end of the flexible rod;
  a second pivot shaft mounted through the through hole of the base mount and the elongated hole of the swing base, wherein the swing base is able to be turned relative to the holding base or be securely held on the holding base;
  a clamping panel mounted on a side of the base mount; and
  a bolt mounted through the base mount and the clamping panel and combined with a nut, wherein a clamping recess is defined between the base mount and the clamping panel; and
a positioning panel being elongated, securely mounted on the cap, mounted through the clamping recess and selectively held by the clamping panel and the base mount of the holding base.

16. The helmet as claimed in claim 14, wherein
the cap has multiple through holes separately formed through the cap; and
the helmet further comprises a battery set assembled on the cap and including
  a bag for mounting a battery; and
  a fixing element connected to the bag and connected to the cap through at least one of the through holes of the cap.

17. The helmet as claimed in claim 1 further comprising a supporting device assembled on the cap and including:
a flexible rod having a first end and a second end;
a mounting base pivotally mounted on the first end of the flexible rod;
a pivot rod;
a swing base pivotally mounted on the second end of the flexible rod and having
  an elongated hole being arced and formed through the swing base; and
  a pivot hole formed through the swing base and disposed at a center of curvature of the elongated hole;
a holding base mounted on the swing base and having
  a base mount having
    a pivot hole formed through the base mount and aligning with the pivot hole of the swing base; and
    a through hole formed through the base mount and aligning with the elongated hole of the swing base;
  a first pivot shaft mounted through the pivot hole of the base mount, the pivot hole of the swing base, and the second end of the flexible rod;
  a second pivot shaft mounted through the through hole of the base mount and the elongated hole of the swing base, wherein the swing base is able to be turned relative to the holding base or be securely held on the holding base;
  a clamping panel mounted on a side of the base mount; and
  a bolt mounted through the base mount and the clamping panel and combined with a nut, wherein a clamping recess is defined between the base mount and the clamping panel; and
a positioning panel being elongated, securely mounted on the cap, mounted through the clamping recess and selectively held by the clamping panel and the base mount of the holding base.

18. The helmet as claimed in claim 1, wherein
the cap has multiple through holes separately formed through the cap; and
the helmet further comprises a battery set assembled on the cap and including
  a bag for mounting a battery; and
  a fixing element connected to the bag and connected to the cap through at least one of the through holes of the cap.

* * * * *